3,535,263
ETHANOLAMINE SOLUTIONS STABILIZED WITH AN ALDONIC ACID OR AN ALDONATE
Kshatra Pati Singh, Montreal, Quebec, Canada, assignor to Union Carbide Canada Limited, Toronto, Ontario, Canada, a corporation of Canada
No Drawing. Filed Mar. 25, 1968, Ser. No. 715,567
Int. Cl. B01d 47/02; C07c 91/04
U.S. Cl. 252—192         9 Claims

ABSTRACT OF THE DISCLOSURE

In the use of aqueous ethanolamine solutions in the purification of natural gas, degradation of the ethanolamine frequently occurs due to the presence of certain impurities such as hydrogen sulfide, carbonyl sulfide and mercaptans in the gas. Improved resistance to degradation is obtained by incorporating certain polyhydroxy-monocarboxylic acids or their salts, such as sodium gluconate, in the ethanolamine solution.

---

The present invention relates to the treating of gas with aqueous monoethanolamine to remove certain impurities therefrom. More particularly it relates to a method and composition for "sweetening" natural gas by means of an aqueous monoethanolamine solution.

The use of aqueous monoethanolamine to remove certain impurities such as water, carbon dioxide, hydrogen sulfide, carbonyl sulfide and mercaptans from gas such as air or natural gas is well known. In the case of natural gas, purification systems for "sweetening" the natural gas are frequently established at the wellhead sight so that the above impurities can be removed before the gas is delivered to a pipeline.

Briefly the process of removing such impurities from natural gas with aqueous monoethanolamine ultilizes the principle of absorption and adsorption wherein a solution of monoethanolamine is contacted with the sour gas in a tray or packed absorber at a temperature ranging from 60° F. to 140° F. at moderate to high pressure. The process is usually a cyclic one wherein the monoethanolamine solution is contacted with the sour gas as explained above, and then the impurity rich monoethanolamine is discharged from the bottom of the adsorber and is subsequently regenerated by heat at 220°–250° F. at which temperature the most of the adsorbed impurities are removed.

The details of such adsorption of natural gas impurities is well known in the art and although gas "sweetening" with monoethanolamine has many advantages, shut down and replacement of the ethanolamine solution must be carried out frequently due to degradation. This is particularly true where the gas being subjected to purification contains sulfide compounds such as hydrogen sulfide, carbonyl sulfide and mercaptans. Other acid gas such as carbon dioxide also tend to degrade the ethanolamine solution.

It is therefore an object of the present invention to provide an aqueous monoethanolamine solution which has improved resistance to degradation in the presence of certain acid gases.

It is another object of the invention to provide a monoethanolamine solution for sweetening natural gas on a continuous basis which requires less frequent replacement.

These objects are accomplished by incorporating into an aqueous solution of monoethanolamine a stabilizing amount of a compound of the formula:

wherein $n$ is 4.

The above water soluble polyhydroxy-monocarboxylic acids can exist in eight different isomeric forms which are respectively named gluconic acid, mannonic acid, galactonic acid, allonic acid, altronic acid, talonic acid, gulonic acid and idonic acid. Because of its ready availability and relatively low cost gluconic acid is the preferred compound.

Water soluble acid salts of the above compounds can also be used to provide the desired stability, for example such metal salts as sodium, potassium, calcium and barium can be used. Sodium is the preferred salt and the preferred additive to the ethanolamine solution of this invention is sodium gluconate.

It is found that compounds of the present invention provide most effective stability in an aqueous monoethanolamine solution when they are present in an amount of from 0.5 percent by weight to 5 percent by weight although as little as 0.1 percent by weight of such compounds provide adequate stability and as much as 10 percent by weight of such compounds give the desired stability. It was found however that above 10 percent the stabilization of the ethanolamine solution is not significantly increased.

The polyhydroxymonocarboxylic acids of this invention are usually classified as chelating agents. However the exact nature of the process whereby the compounds of this invention act as stabilizers in ethanolamine solutions is not known. It appears however that the degradation of monoethanolamine is accompanied by the formation of certain degradation products of monoethanolamine. The products include:

(1) oxazolidinone 2 (OX)
(2) N-(2-hydroxyethyl)-ethylene diamine (HEED)
(3) N-(2-hydroxyethyl)-imidazolidinone-2 (IMID)
(4) Unknown nitrogenous and sulphur containing compounds depending upon the nature of the impurities present in the solution.

It is known that degradation of ethanolamine primarily occurs at elevated temperatures. Tests were therefore carried out on ethanolamine solutions having measured quantities of impurities at a temperature of approximately 150° C. and an operating pressure of from 190 to about 200 p.s.i.g. Tests were carried out on ethanolamine solutions containing compounds disclosed in the present invention. The degradation of ethanolamine was compared to a solution tested without one of the disclosed compounds.

The test equipment consisted essentially of a stainless steel pressure vessel equipped with a mechanical stirrer and a heating jacket. Gas inlet means is located on the vessel so that when the aqueous ethanolamine test solution is in the vessel under pressure, a measured amount of nitrogen purge gas and samples of impurity gas such as carbon dioxide, hydrogen sulfide, carbonyl sulfide and mercaptans can be added. A vent means is also located on the vessel for discharging the remaining gas after the test period. A thermocouple is also located in the vessel for indicating the temperature of the solution during testing.

EXAMPLE I 61.0 gms. of monoethanolamine in 244.0 gms. of water was charged into a reactor vessel. After flushing the reactor with nitrogen, 51.8 gms. of carbon dioxide were introduced into the reactor at a pressure of 50 p.s.i.g. The reactor was heated to 152° C. and the pressure inside the vessel was increased to 199 p.s.i.g. This temperature and pressure was maintained for approximately 4 hours during which time the reaction was stirred vigorously.

The reaction was then cooled and the pressure reduced. The excess gas was vented off. The contents of the reactor were analyzed by vapor phase gas chromatograph. The extent of degradation was calculated based on the amount of monoethanolamine recovered. 58.89 gms. of monoethanolamine or 96.54 percent of starting material was recovered. Therefore the amount of monoethanolamine degraded during the heating period was 3.46 percent.

EXAMPLE II

The above example was repeated using the same amount of aqueous monoethanolamine but after nitrogen purging 21.9 gms. of hydrogen sulfide, 4.1 gms. of carbonyl sulfide and 30.0 gms. of carbon dioxide was added. The reaction was stirred for 3.7 hours at a temperature of 152° C. and a pressure of 200 p.s.i.g. The amount of monoethanolamine degraded was found to be 5.15 percent by weight.

EXAMPLE III

The test was repeated using 21.0 gms. of carbon dioxide and 30.0 gms. of hydrogen sulfide. The reaction was stirred for 9.6 hours at 151° C. and 193 p.s.i.g. The amount of monoethanolamine degraded was found to be 4.16 percent by weight.

EXAMPLE IV

In this test 61.0 gms. of monoethanolamine in 244.0 gms. of water was also used. In addition 0.6 gms. of sodium gluconate was included in the solution. A test gas consisting of 15.3 gms. carbon dioxide, 21.3 gms. hydrogen sulfide and 9.7 gms. carbonyl sulfide was charged into the reactor and the reaction was stirred for 4.1 hours at 149° C. and 200 p.s.i.g. The total degradation of monoethanolamine amounted to only 0.6 percent by weight of starting material.

EXAMPLE V

An equal amount of monoethanolamine was used together with 3 percent by weight of sodium gluconate in 244.0 gms. of water. The charge gas consisted of 21.4 gms. of hydrogen sulfide, 26.5 gms. of carbon dioxide and 7.6 gms. of carbonyl sulfide. The reaction was stirred for 4.1 hours at 150° C. and 200 p.s.i.g. The total degradation of monoethanolamine amounted to only 0.85 percent by weight of starting material.

EXAMPLE VI 61.0 gms. of monoethanolamine together with 5 percent by weight of sodium gluconate were dissolved in 244.0 gms. of water. The charge gas consisted of 22.2 gms. of hydrogen sulfide, 2.2 gms. of carbonyl sulfide and 29.3 gms. of carbon dioxide. The reaction was stirred for 4.1 hours at 150° C. and 199 p.s.i.g. Total loss of monoethanolamine: 0.61 percent by weight.

EXAMPLE VII 61.0 gms. of monoethanolamine together with 1 percent by weight of gluconic acid were dissolved in 244.0 gms. of water. The charge gas consisted of 56.1 gms. of carbon dioxide, 22.8 gms. of hydrogen sulfide and 4.1 gms. of carbonyl sulfide. The reaction was stirred for 4.1 hours at 151° C. and 192 p.s.i.g. Total loss of monoethanolamine: 0.7 percent by weight.

EXAMPLE VIII 61.0 gms. of monoethanolamine together with 3 percent by weight of gluconic acid dissolved in 244.0 gms. of water. The charge gas consisted of 15.4 gms. of carbon dioxide, 4.6 gms. of carbonyl sulfide and 24.0 gms. of hydrogen sulfide. The reaction was stirred for 4.1 hours at 148° C. and 201 p.s.i.g. Total loss of monoethanolamine: 0.6 percent by weight.

EXAMPLE IX 61.0 gms. of monoethanolamine together with 5 percent by weight of gluconic acid were dissolved in 244.0 gms. of water. The charge gas consisted of 13.9 gms. of carbon dioxide, 21.8 gms. of hydrogen sulfide and 4.1 gms. of carbonyl sulfide. The reactor was stirred for 4.1 hours at 150° C. and 200 p.s.i.g. Total loss of monoethalonamine: 0.7 percent by weight.

I claim:
1. A method of stabilizing an aqueous ethanolamine solution against degradation in the presence of a gas selected from the group consisting of carbon dioxide, hydrogen sulfide, carbonyl sulfide and mercaptans which comprises incorporating in said solution a stabilizing amount of a compound of the formula:

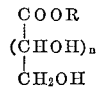

wherein $n$ is 4, and R is one selected from the group consisting of H, an alkali metal, and an alkaline earth metal.

2. A method as claimed in claim 1 wherein the said compound is present in an amount of from 0.1 percent to 10 percent by weight of ethanolamine.

3. A method as claimed in claim 1 wherein the said compound is present in an amount of from 0.5 percent to 5 percent by weight of ethanolamine.

4. A method as claimed in claim 3 wherein the said compound is one selected from the group consisting of gluconic acid, sodium gluconate, allonic acid, and sodium allonate.

5. A method as claimed in claim 1 wherein said compound is sodium gluconate and wherein said sodium gluconate is present in the solution in an amount of from 1 percent to 5 percent by weight of ethanolamine.

6. A method as claimed in claim 1 wherein said compound is gluconic acid and wherein said gluconic acid is present in the solution in an amount of from 1 percent to 5 percent by weight of ethanolamine.

7. A composition consisting essentially of an aqueous solution of ethanolamine and 0.1 percent to 10 percent by weight of a compound of the formula:

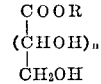

wherein $n$ is 4 and R is one selected from the group consisting of H and an alkali metal, and an alkaline earth metal.

8. A composition as claimed in claim 7 wherein said compound is sodium gluconate and wherein said sodium gluconate is present in an amount of from 0.5 percent to 5 percent by weight of said ethanolamine.

9. A composition as claimed in claim 7 wherein said compound is gluconic acid and wherein said gluconic acid is present in an amount of from 0.5 percent to 5 percent by weight of said ethanolamine.

References Cited

UNITED STATES PATENTS

| | | | |
|---|---|---|---|
| 2,718,454 | 9/1955 | Wylie | 252—192 |
| 2,901,513 | 8/1959 | Thomas | 260—584 |
| 3,137,654 | 6/1964 | Johnson et al. | 252—189 |
| 3,372,981 | 3/1968 | Ravner et al. | 252—189 |
| 3,454,501 | 7/1969 | Ziffer et al. | 252—407 |

LEON D. ROSDOL, Primary Examiner

I. GLUCK, Assistant Examiner

U.S. Cl. X.R.

23—2; 252—189, 403, 407; 260—584